United States Patent [19]
Childers et al.

[11] Patent Number: 5,321,510
[45] Date of Patent: Jun. 14, 1994

[54] SERIAL VIDEO PROCESSOR

[75] Inventors: Jimmie D. Childers, Missouri City; Adin Hyslop, Houston, both of Tex.

[73] Assignee: Texas Instruments Incorporated, Dallas, Tex.

[21] Appl. No.: 895,146

[22] Filed: Jun. 5, 1992

Related U.S. Application Data

[63] Continuation of Ser. No. 658,426, Feb. 20, 1991, abandoned, which is a continuation of Ser. No. 541,458, Jun. 22, 1990, abandoned, which is a continuation of Ser. No. 435,862, Nov. 13, 1989, abandoned, which is a continuation of Ser. No. 119,840, Nov. 13, 1987, abandoned.

[51] Int. Cl.$^5$ ............................................. H04N 5/14
[52] U.S. Cl. .................................................. 348/571
[58] Field of Search ............... 358/21 R, 160; 382/41, 382/42; 324/73 R; 364/604; H04N 5/14

[56] References Cited

U.S. PATENT DOCUMENTS

| | | | |
|---|---|---|---|
| 4,228,528 | 10/1980 | Cenker et al. | 307/441 |
| 4,281,398 | 7/1981 | McKenny et al. | 307/441 |
| 4,346,405 | 8/1982 | Yoda et al. | 358/160 |
| 4,363,104 | 12/1982 | Nussmeier | 358/166 |
| 4,432,052 | 2/1984 | McDonough et al. | 364/200 |
| 4,550,437 | 10/1985 | Kobayashi et al. | 382/41 |
| 4,562,435 | 12/1985 | McDonough et al. | 340/798 |
| 4,672,240 | 6/1987 | Smith et al. | 307/441 |
| 4,689,494 | 8/1987 | Chen et al. | 307/441 |
| 4,689,823 | 8/1987 | Wojcik et al. | 358/160 |
| 4,694,432 | 9/1987 | Mayatake et al. | 307/441 |
| 4,719,410 | 1/1988 | Nishimura | 324/73 R |
| 4,739,474 | 4/1988 | Holsztynski | 364/200 |
| 4,776,025 | 10/1988 | Hosoda | 382/27 |
| 4,790,026 | 12/1988 | Gennery et al. | 382/49 |
| 4,791,677 | 12/1988 | Mori et al. | 382/41 |
| 4,805,227 | 2/1989 | Wehner | 382/41 |
| 4,817,175 | 3/1989 | Tenenbaum et al. | 382/41 |
| 4,942,470 | 7/1990 | Nishitori et al. | 358/160 |

OTHER PUBLICATIONS

Davis, Ronald, et al., Systolic Array Chip Matches the Pace of High-Speed Processing, Electronic Design, Oct. 31, 1984, pp. 207-218.

Hannaway, Wyndham, et al., Handling Real-Time Images Comes Naturally to Systolic Array Chip, Electronic Design, Nov. 15, 1984, pp. 289-300.

Smith, Jr., Winthrop W. et al., Systolic Array Chip Recognizes Visual Patterns Quicker Than A wink, Electronic Design, Nov. 29, 1984, pp. 257-266.

(List continued on next page.)

Primary Examiner—James J. Groody
Assistant Examiner—David E. Harvey
Attorney, Agent, or Firm—J. P. Violette; Robert D. Marshall; James C. Kesterson

[57] ABSTRACT

A system for real-time digital processing of a video signal using a large number of one-bit serial processor elements each of which operates on one pixel of a horizontal scan. The video signal is converted to digital by an A-to-D converter, and stored in a set of input registers, one register for each processor element. All of these input registers are loaded during a horizontal scan, as the input registers are addressed in sequence by a commutator. Each processor element includes a one-bit binary adder, a set of one-bit registers, and two one-bit wide data memories of a size to store data from several scans. The processor elements are all controlled in common by a sequencer, a state machine or a processor. The processed video data is transferred to an output register for each processor element, from which it is converted to a video signal by a D-to-A converter. A frame memory may be used to save a processed frame for use in convolving the next frame; the input of the frame memory is taken at the output registers, and the frame memory output is applied to the input registers.

42 Claims, 6 Drawing Sheets

OTHER PUBLICATIONS

Wallis, Lyle, Associative Memory Calls on the Talents of Systolic Array Chip, Electronic Design, Dec. 13, 1984, pp. 217–226.

Fisher, Allen L., et al., Real-Time Image Processing on Scan Line Array Processors, IEEE, 1985.

Hillis, W. Daniel, text book excerpt, The Connection Machine, The MIT Press series in artificial intelligence-THESIS (Ph.D.)-MIT, 1985, pp. 18–28.

Fountain, T. J., text book, Integrated Technology for Parallel Image Processing, "Plans for the CLIP7 Chip.", Chapter 13, pp. 199–214.

Gharachorloo, Nader, et al., A Super Buffer: A Systolic VLSI Graphics Engine for Real-Time Raster Image Generation, 1985, Chapel Hill Conference on VLSI, pp. 285–305.

Wilson, Ph.D., Stephen S., The Pixie-5000-A Systolic Array Processor, IEEE, Mar. 1985, pp. 477–483.

Fisher, Allan L., Scan Line Array Processor for Image Computation, IEEE 13th Annual International Symposium on Compu. Arch., Compu. Arch. News, vol. 14, No. 2, Jun. 1986, pp. 338–345.

Waltz, David L. Applications of the Connection Machine, IEEE Computer Magazine, Jan. 1987, pp. 85–97.

Fisher, Allan L., et al., Architecture of a VLSI SIMD Processing Element, IEEE International Conference on Circuits and Design, 1987, pp. 324–327.

Webber, Donald M., Circuit Simulation on the Connection Machine, IEEE 24th ACM. Design Automation Conference, 1987, pp. 108–113.

5,321,510

SERIAL VIDEO PROCESSOR

This application is a continuation of application Ser. No. 07/658,426, filed Feb. 20, 1991, which is a continuation of application Ser. No. 07/541,458, filed Jun. 22, 1990, which is a continuation of Ser. No. 07/435,862, filed on Nov. 13, 1989, which is a continuation of Ser. No. 07/119,890, filed on Nov. 13, 1987 wherein Ser. No. 07/658,426, Ser. No. 07/541,458, Ser. No. 07/435,862, and Ser. No. 07/119,890 are now abandoned.

BACKGROUND OF THE INVENTION

This invention relates to digital signal processor systems, and more particularly to a serial processor especially useful for video signal processing or the like.

Real-time processing of video signals such as standard TV, for image enhancement or the like, requires a massive amount of data handling and processing in a short time interval. One method heretofore proposed for image processing uses an array of single-bit microprocessors as set forth by Davis et al in Electronic Design, Oct. 31, 1984, pp. 207-218, and a series of articles following this publication, particularly Electronic Design, Nov. 15, 1984, pp. 289-300, Nov. 29, 1984, pp. 257-266, Dec. 13, 1984, pp. 217-226, and Jan. 10, 1985, pp. 349-356. In order to process video in real time, this system used an array of 48×48 processor elements, actually formed by 32 chips with 6×12 processor elements per chip. Each processor element was connected for data transfer to its four adjacent elements, North, South, East and West. Such a structure required a very large number of interconnections between processors and between chips, resulting in expensive equipment of limited capability and questionable reliability.

It is the primary object of this invention to provide an improved video signal processor or the like, in particular a processor capable of real-time processing of video signals. Another object is to provide an image processor capable of performing convolutions or similar algorithms on large amounts of data in real time. A further object is to provide a linear array of serial processors configured to do convolutions or the like on all pixels of a scan line at the same time. An additional object is to provide a lower-cost and more reliable processor of the type useful for video signal processing or image enhancement.

SUMMARY OF THE INVENTION

In accordance with one embodiment of the invention, a system for real-time digital processing of a video signal is disclosed, using a linear array of a large number of one-bit serial processor elements, each operating on one pixel of a horizontal scan. The video signal is converted to digital by an A-to-D converter, and one full scan line is stored in a set of input registers, one register for each processor element. All of these input registers are loaded during a horizontal scan, as the input registers are addressed in sequence by a commutator. Each processor element includes a one-bit binary adder, a set of one-bit registers, and two one-bit wide data memories of a size to store data from several scans. There is no physical connection to the "North and South" processor elements, but instead the data memories provide this function. The processor elements are all controlled in common by stored microcide, or by a sequencer, a state machine or a processor. The processed video data is transferred to an output register for each processor element, from which it is off-loaded in sequence defined by a commutator, then converted to a video signal by a D-to-A converter. A frame memory may be used to save a processed frame for use in convolving the next frame; the input of the frame memory is taken at the output registers, and the frame memory output is applied to the input registers.

The serial processor elements are configured as a linear array, and laid out in a semiconductor integrated circuit in a regular pattern, similar to a dynamic RAM, with one column for each element. The column contains the two data memories, the input and output registers, the commutator, and the adder and its register set.

The processor is illustrated as being used for video signal enhancement, but it is also useful for image processing in general, character recognition, signal processing, filtering, and applications of this type.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

DETAILED DESCRIPTION OF SPECIFIC EMBODIMENT

Figure 1:
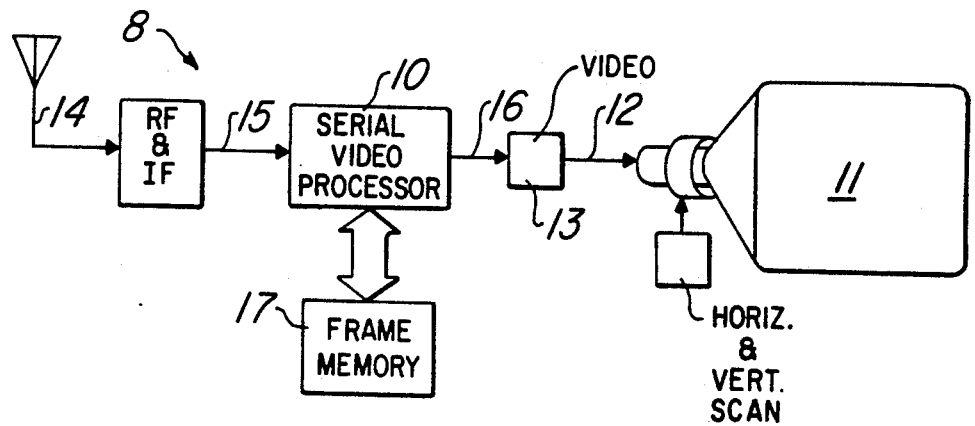
FIG. 1 is an electrical diagram in block form of one example of a video system which uses the serial video processor according to the invention.

Referring to FIG. 1, a TV or video system which may use a serial video processor 10 according to the invention, in this example, consists of a CRT 11 of the raster-scanned type receiving an analog video signal at input 12 from standard video circuits 13 as used in a conventional TV set. A video signal from an antenna 14, or from a VCR or the like, is treated in the usual manner through RF and IF stages of a tuner, producing an analog composite video signal at a line 15. This analog input 15 is the same as would be the input 16 to the video circuitry 13, if the serial video processor 10 were not used, so it is seen that in this example the processor 10 is merely interposed in the signal stream at the output of the IF strip. The processor 10 functions to perform various signal enhancement operations on the video signal, and to this end would usually save one (or more) frames in a frame memory 17. The horizontal synch, vertical synch, and color burst would be recovered separately; i.e., would by-pass the signal processor illustrated herein, which deals only with the video signal, for illustrative purposes.

Figure 2:
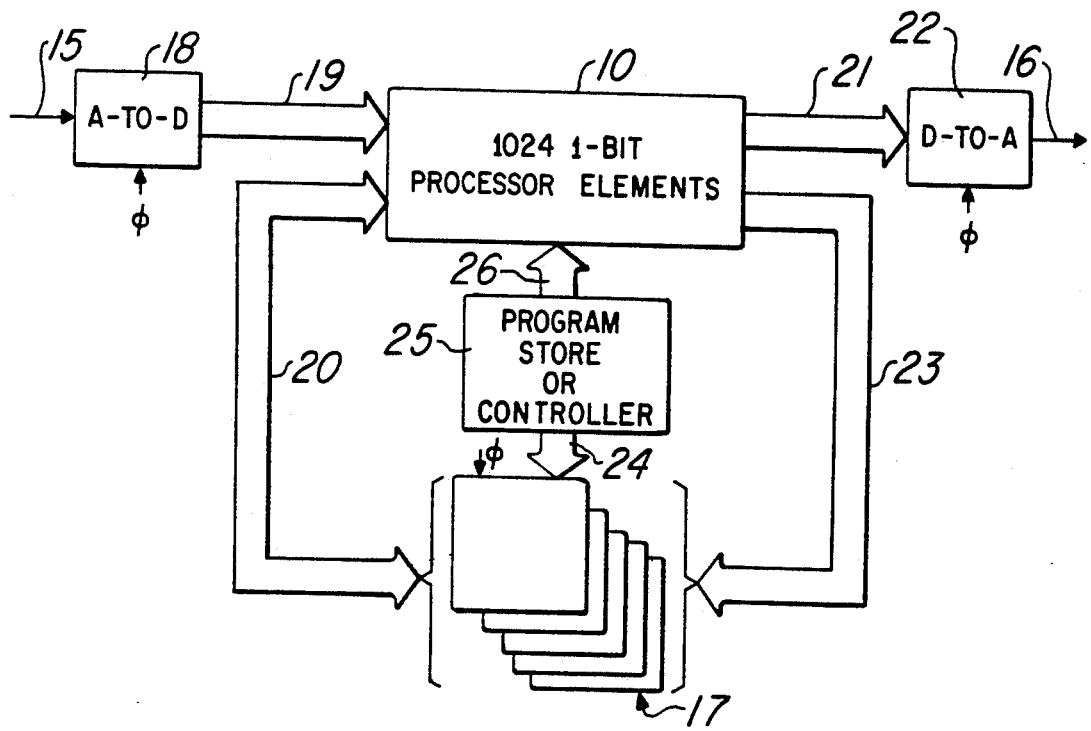
FIG. 2 is an electrical diagram in block form of the serial video processor on the system in FIG. 1.

In FIG. 2, a block diagram of the serial video processor 10 and frame memory 17 is shown in more detail. The video signal input on line 15 is converted to 8-bit digitized video data in an A-to-D converter 18 which operates at a sampling rate of, for example, 14.32 MHz (a multiple ×4 of the color subcarrier 3.58 MHz), producing an 8-bit parallel output on lines 19 as one input to the video processor 10. The other 8-bit data input 20 to the processor 10 is the output of the frame buffer memory 17, which stores the processed video data for the previous frame. The frame memory 17 may consist of a bank of video DRAMs as commercially available, or, since the random access function is not needed, frame memory devices with only serial I/O may be used. The processed video data is output from the video processor on eight lines 21 to an 8-bit digital-to-analog converter 22 which produces the input 16 to the video circuitry. The system illustrated as an example may be black and white or color, since the real-time image enhancement processing is done on the composite video signal. The processor can also perform the color separation, which will not be treated in this application. The processed video data is also applied by eight lines 23 to the input of the frame memory 17. The frame memory 17 also receives controls and clocking on lines 24 from the video processor 10 or from a controller 25. For relatively low speeds, controller 25 may be a standard microprocessor or microcontroller device such as a commercially-available TMS 7000, for example, as described in detail in U.S. Pat. No. 4,432,052. Or, for faster speeds, a higher speed controller may be needed; the code can be stored in RAM or ROM, or a state machine or sequencer of conventional form may be employed. The controller 25 functions to apply twenty-one microcode control bits and sixteen address bits on lines 26 to the video processor. Indeed, the program store or controller 25 may be on the same semiconductor chip as the video processor 10, especially if it merely consists of stored code in a ROM with associated address counter.

Figure 3:
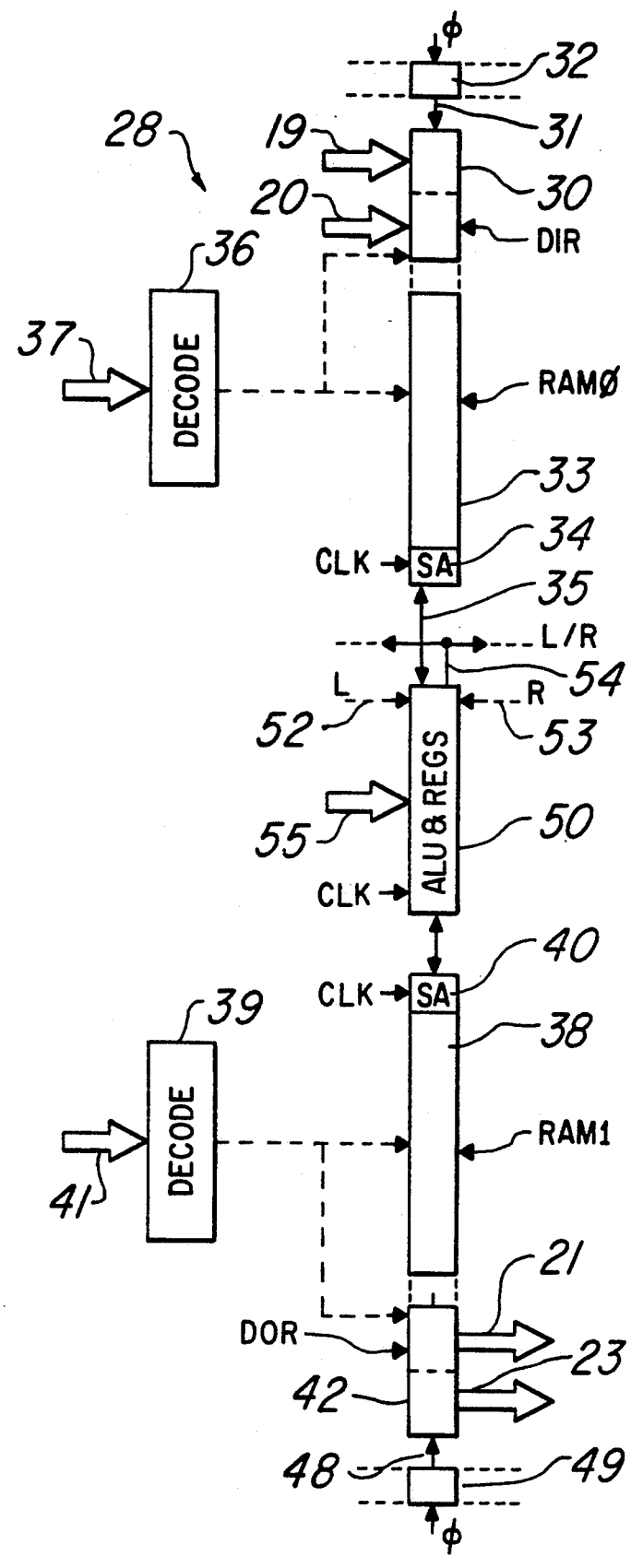
FIG. 3 is an electrical diagram in block form in more detail of the serial video processor of FIGS. 1 or 2.

Referring to FIG. 3, an example of one of the serial processor elements contained in the serial video processor 10 is illustrated. The video processor 10 may contain, for example, 1024 identical processor elements as shown in FIG. 3, in a linear array. Each processor element includes a 16-bit data input register 30 receiving the two 8-bit parallel inputs 19 and 20 from the A-to-D converter and from the frame memory 17; the input register 30, also referred to as the DIR register, loads the data on lines 19 and 20, only when an enable signal is applied at an input 31, this enable signal being received from a 1-of-1024 commutator or ring counter 32 triggered to begin at the end of a horizontal blanking period and continue for 1024 cycles synchronized with the sampling frequency of the A-to-D converter 18. The sixteen bits of the register 30 are also addressed one at a time by an address input from the controller 25 as will be described, for selection to write into a data memory 33; this data memory 33 is referred to as RAM0 and consists of a 128-bit dynamic random-access memory configured 1×128. Actually, the RAM0 data memory 33 and the DIR input register 30 are parts of the same 1×144 DRAM column, but the register 30 differs from the RAM0 part in that the DIR part is dual ported so it can be written into from the inputs 19 and 20, all sixteen bits in parallel. The 1-bit data input/output line 35 for RAM0 is coupled to the column or bit-line I/O for a sense amplifier of a DRAM column. The particular bit being addressed in the 1×128 memory RAM0 part of the column is selected by 128 word lines shared by all 1024 processor elements; a shared 1-of-144 decode 36 receives an 8-bit address 37 (actually seven address bits and one of the twenty-one control bits) from the controller 25 and applies the same word line selection to RAM0 or DIR of all 1024 processor elements. Likewise, a second one-bit wide dynamic memory 38, referred to as RAM1, is used on the output side of the processor, again having a shared decoder 39 producing a 1-of-144 word line selection from an 8-bit address on lines 41 from controller 25. The RAM1 memory is associated with a 16-bit data output register 42 also called DOR, also addressed by a 1-of-16 selection from the shared decoder 39. The addresses 37 and 41 for the input and output registers 30 and 42 and data memories 33 and 38 are each 8-bit inputs 37 and 41 to decoders 36 and 39, shared by all 1024 processor elements, these inputs 36 and 39 being generated by the controller 25. The output register 42 is selected for 16-bit parallel data output on lines 21 and 23 by an input 48 from a 1-of-1024 commutator or ring counter 49. The input commutator 32 is clocked at above 1024 times the horizontal scan rate, so all 1024 of the input registers 30 can be loaded during a horizontal scan period. The output commutator 49 maybe clocked at the same rate as the input.

The processor element of FIG. 3 includes an ALU and register set 50 which functions to perform one-bit arithmetic/logic functions on one-bit inputs from RAM0 and RAM1, and to write the one-bit result to RAM0 or RAM1, or alternatively, the one-bit IO of the ALU 50 may be the adjacent "East and West" processor elements on either side via left or right data inputs 52 or 53, or left/right data output line 54. The one-bit arithmetic/logic function is defined by a 22-bit microcode control input 55 from the controller 25. In one clock cycle defined by a clock input CLK to the sense amplifiers of the data memories 33 and 38 and to the ALU 50, the processor element of FIG. 3 performs one of the operations of the instruction set described below on inputs from RAM0, RAM1, L or R, and applies the result to RAM0, RAM1, input only or output only, as selected by the microcode input 55 and addresses 37 and 41. This CLK input is at about 50 nS repetition rate, or 20 MHz; it need not be correlated with the clocking of the commutators 32 and 49.

Figure 4:
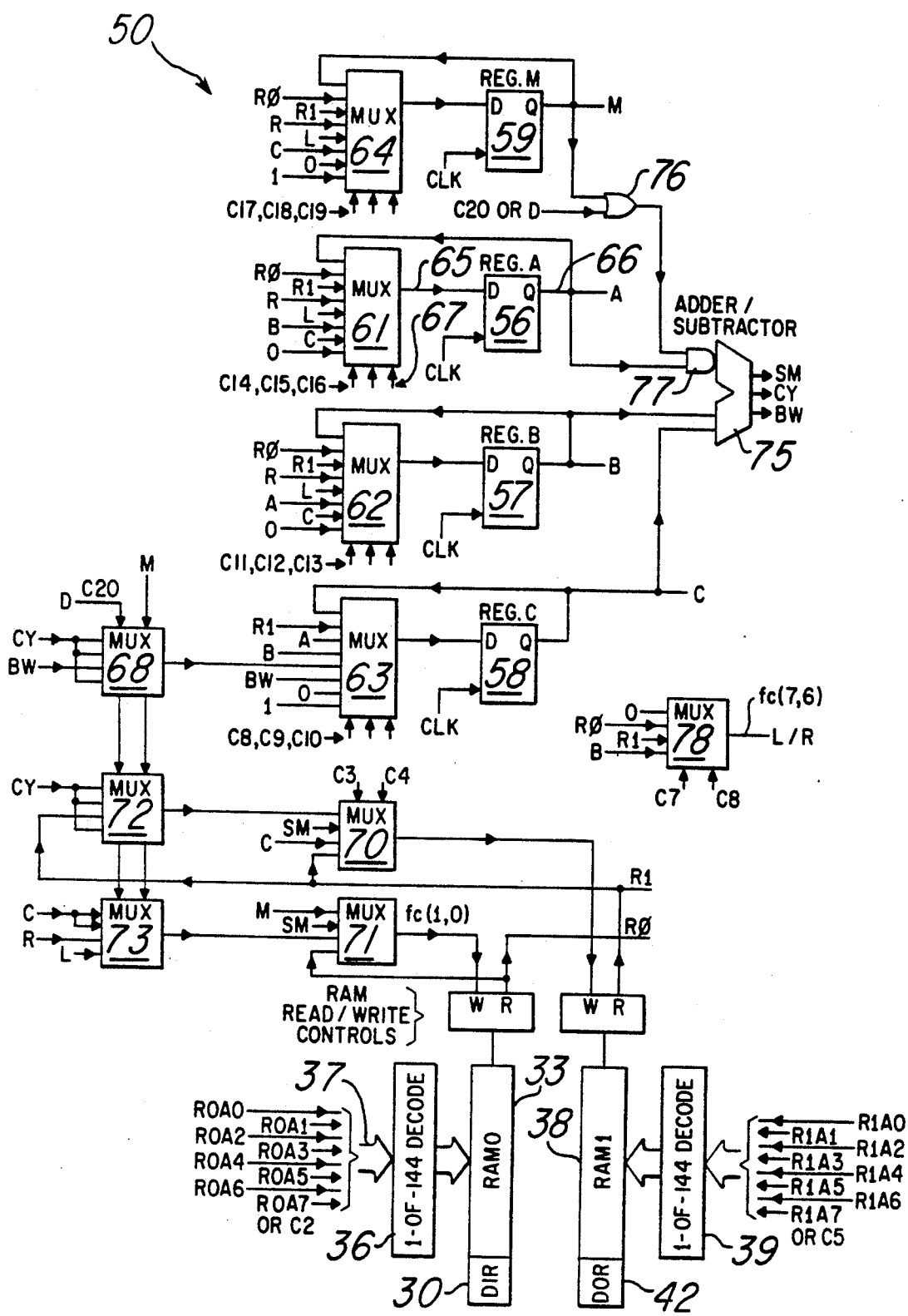
FIG. 4 is an electrical diagram in schematic form of the registers, multiplexers, circuits, and ALU of the processor of FIG. 3.

Referring to FIG. 4, the ALU and register set 50 of the processor element of FIG. 3 is shown in more detail. In this block diagram, the selected conditional one-bit input from RAM0 or RAM1 is referred to as R0 or R1, the twenty-one microcode control bits are referred to as C0 to C20, the carry bit is CY, the borrow bit is BW, and the sum bit is SM. Four one-bit clocked registers 56,57,58, and 59 are included, referred to as Register A, Register B, Register C and Register M; these are standard D flip-flop circuits having D and Q input/output terminals and a clock input CLK. Each of the registers 56–59 has a multiplexer 61,62,63 or 64 which is a 1-of-8 selector controlled by three respective bits of the microcode control bits 55 as indicated. Thus, the register 56 or Reg A, for example, receives a one-bit input on line 65 from its own output 66, or it receives R0 or R1, or the right or left lines 52 or 53, or the B or C registers, or a hard-wired zero, as selected by three bits C14–C16 from the controller 25 on lines 67, depending upon the binary value 000 thru 111 of this control input. Registers B, C and M are likewise controlled. The Register C has an additional multiplexer 68 referred to as the divide multiplexer, as one of the inputs of its multiplexer 63, receiving the control bits C20 and the Reg M output M as its selector bits. Input for the RAM0 data memory 33, and for the RAM1 data memory 38, is controlled by the RAM0 and RAM1 write control multiplexers 70 and 71. Conditional multiplexers 72 and 73 responsive to the C20 control bit and the Reg M output provide a data-dependent write input for RAM0 and RAM1. The R0 and R1 bits used as the inputs of multiplexers 61,62,63 and 64 are the "read" outputs for RAM0 and RAM1. Each of the multiplexers 70, 71, 72 and 73 is a 1-of-4 selector receiving two control bits C0,C1,C3,C4, C20 or M as indicated. Control bits C2 and C5 are the same as address bits A7 for RAM0 and RAM1, and are used to select the DIR or DOR registers instead of RAM0 and RAM1 for data transfer. The ALU itself consists of a binary full adder/subtractor 75, and two-input OR and AND gates 76 and 77, all receiving inputs A, B, C, M and C20 (or D) as indicated and producing outputs Sum Sm, Carry Cy and Borrow BW as shown. A left-/right control L/R is produced by a one-of-4 multiplexer 78 based upon the inputs R0, R1, B and logical zero, as selected by control bits C6 and C7.

Figure 5:
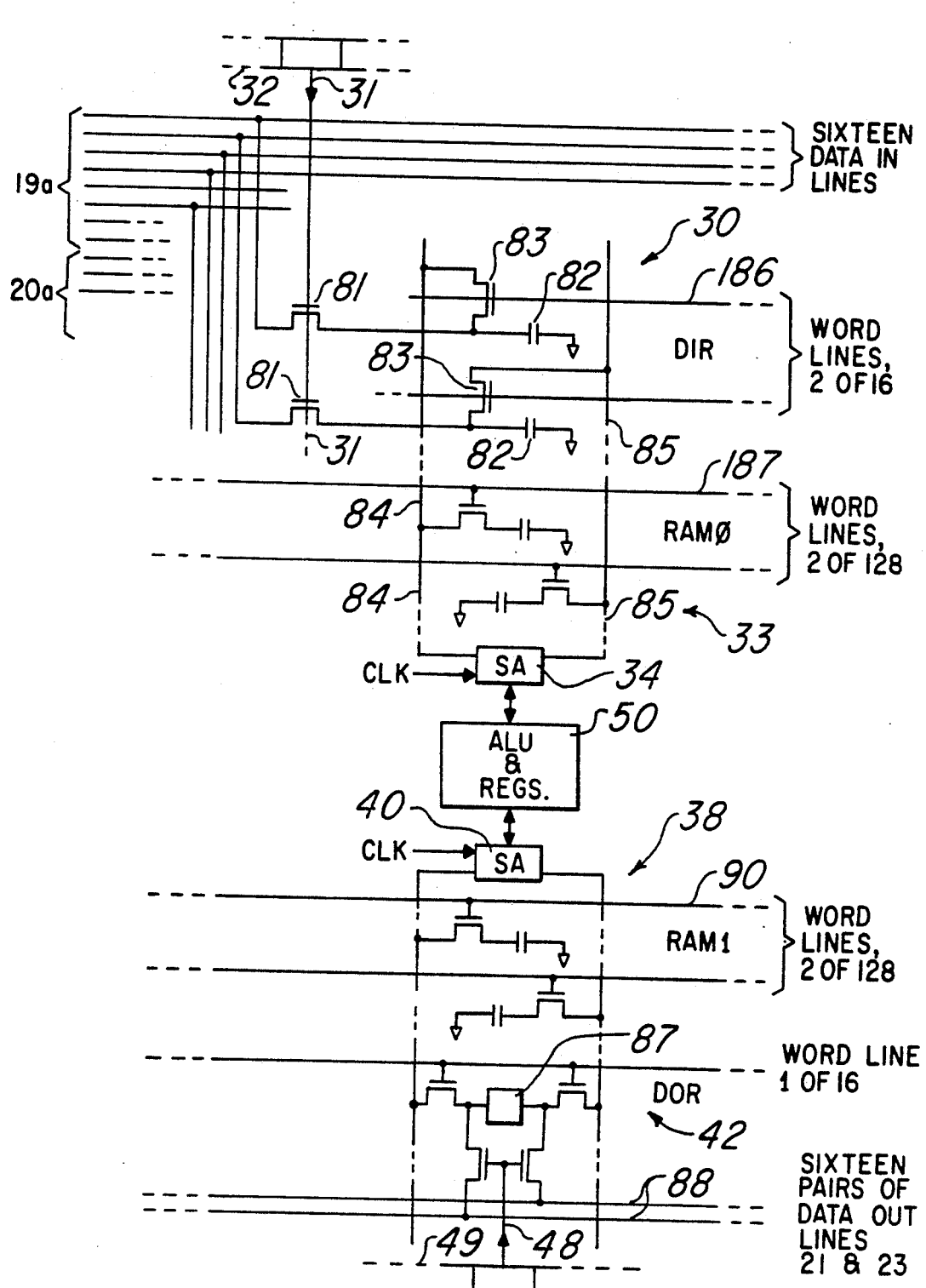
FIG. 5 is an electrical diagram in schematic form of the input and output registers of the processor element of FIG. 3.

The dual-port input registers 30 are illustrated in FIG. 5, wherein the pointer input 31 from the commutator 32 is seen to drive a set of sixteen input transistors 81 which connect sixteen data lines 19a and 20a (from the parallel inputs 19 and 20) to dynamic memory cells 82. These cells are dual-port, and are also written to or read from through access transistors 83 and folded bit lines 84 and 85 connected to sense amplifier 86, when addressed by word lines 86. There are sixteen of the word lines 86, and 128 of the word lines 87 for the RAM0 part of this 144-bit dynamic RAM column. There should be no conflict in the processor trying to write to the cells 82 while they are being read from, because the DIR is loaded to the RAM0 part (and simultaneously the RAM1 part is transferred to the DOR part) only in the thirty-two processor cycles immediately following completion of a horizontal scan; the program stored in controller 25 is written to avoid the conflict, but in any event in video processing there would be not noticeable effect even if a random bit of indeterminate data was introduced, especially after the convolution algorithm.

The dual-port output registers 42 are also illustrated in FIG. 5, and these are the same as the input registers except static cells 87 are used, since the cells have to drive long data and data-bar pairs of lines 88. Again, conflicts between reading out to lines 21,23, and writing to the cells 87 from sense amplifier 89 may be resolved by the stored program; only the thirty-two cycles just after a horizontal scan are used to load DOR from RAM1.

The processor element 50 of FIGS. 3 and 4 provides an instruction set as set forth below as Table A. In forming the instructions of the instruction set, it is understood that each of the registers A,B,C,M and the ALU 75 can perform simultaneous operations. For example, an operation expressed as:

0>A-
:A>B:R0(123)>C:M>M:SM>R1(27):B>GO implies the following simultaneous events:

| | |
|---|---|
| 0 > A | load register A with 0 (zero) |
| A > B | load register B with the contents previously in A |

-continued

| | |
|---|---|
| R0(123) > C | move data from RAM0 address 123 to register C |
| M > M | this is a NO-OP (do nothing) instruction for register M |
| SM > R1(27) | write result of the addition into RAM1 address 27 |
| B > GO | output register B onto GLOBAL OUTPUT line |

The basic format of an instruction is:

Source>Destination:Source>Destination: . . .

The right arrow '>' indicates direction of data flow, and the colon ':' separates statements to be performed simultaneously (same clock cycle). A new line indicates a new clock cycle.

| | | |
|---|---|---|
| A, xB, C, M | Are registers | |
| SM, Cy, BW | Are ALU outputs | |
| xR0(n) | RAM0, address n, | 0 <= n <= 127 |
| xINP(m) | Data Input Register DIR, bits 0–15 | 0 <= m <= 15 |
| xR1(n) | RAM1, address n, | 0 <= n <= 127 |
| xOUT(m) | Data Output Register DOR, bits 0–15, | 0 <= m <= 15 |
| GO where: | Global output line | |
| x = blank | Immediate cell (i.e., processor element) is source/destination | |
| x = L | Cell to left of immediate cell is source/destination | |
| x = R | Cell to right of immediate cell is source/destination | |

A source may be specified more than once in a command line: that is, "A>B:A>C" is legal. However, a destination may be specified only once in a command line: that is, "A>B:B>C" is legal; but "A>C:B>C" is not legal.

Each memory bank may be specified more than once as a source: "R0(13)>A" R0(13)>B" is legal (same address); but "R0(13)>A:R0(100)>B" is not legal (same bank, different adder); while "R0(13)>A:R1(100)>B" is legal (different bank). Each of the banks RAM0 or RAM1 may be specified as a destination only once: that is, "A>R0(13):B>R0(13)" is not legal; but "A>R0(13):B>R1(13)" is legal.

If a bank RAM0 or RAM1 is specified as a source and a destination, the source and destination address must be the same: that is, "R0(22)>C:C>R0(123)" is not legal (same bank, different address); but ":R0(22)>B:SM>R0(22)" is legal (read/modify/write); and "R0(22)>C:C>R1(123)" is legal. Any of these rules set forth above for xR0(n) and Xr1(n) applies to the xINP(m) and xOUT(m) instructions as well, with the exception that the address range of 'n' is 0 to 127 while 'm' is 0 to 15. In each case, ALL references to the characters R0 may be replaced with INP and the characters R1 may be replaced with OUT. That is, if "R0(10)>B:SM>R0(10)" is legal, then: "INP(10)>B:SM>INP(10)" is also legal. Or, "R0(10)>B:SM>INP(10)" is not legal, but "R1(25)>B:SM>INP(10)" is legal (different bank).

Using the instruction set as explained above and in Table A, examples of software algorithms for fixed point arithmetic are set forth in Table B. These examples arbitrarily use eight bits as the source number size; however, the numbers may be any length from one bit to whatever can be accumulated in two banks of 128 bits. This varies according to the operation but is at least 63 bits. Note that in the instruction examples of Table B, C20 is referred to as 'D'; "0>D" is equivalent to "C20=0".

The table below shows the processing speed and required clock cycles of some of these fixed point operations; while eight bit examples are given, there is nothing significant about the word length in principle.

| 8-bit Operation | | Clock Cycles | Speed at 70 nS Cycle Time |
|---|---|---|---|
| * two's complement | | 8 | .56 uS |
| * absolute value | | 9 | .63 |
| * fixed point addition | RAM0 → RAM1 | 9 | .63 |
| * fixed point addition | RAM0 → RAM0 | 17 | 1.19 |
| * fixed point subtraction | RAM0 → RAM1 | 9 | .63 |
| * fixed point subtraction | RAM0 → RAM0 | 17 | 1.19 |
| * fixed point multiply | | 73 | 5.11 |
| * fixed point divide | | 131 | 9.17 |

Even though 0.63 microseconds are needed for a fixed-point addition of two 8-bit numbers (nine 70 nS cycles), it should be recognized that 1024 of these are done simultaneously, so the effective rate is 0.6 nS. Similarly, the effective rate for an 8×8 multiply is 5 nS.

Figure 6:
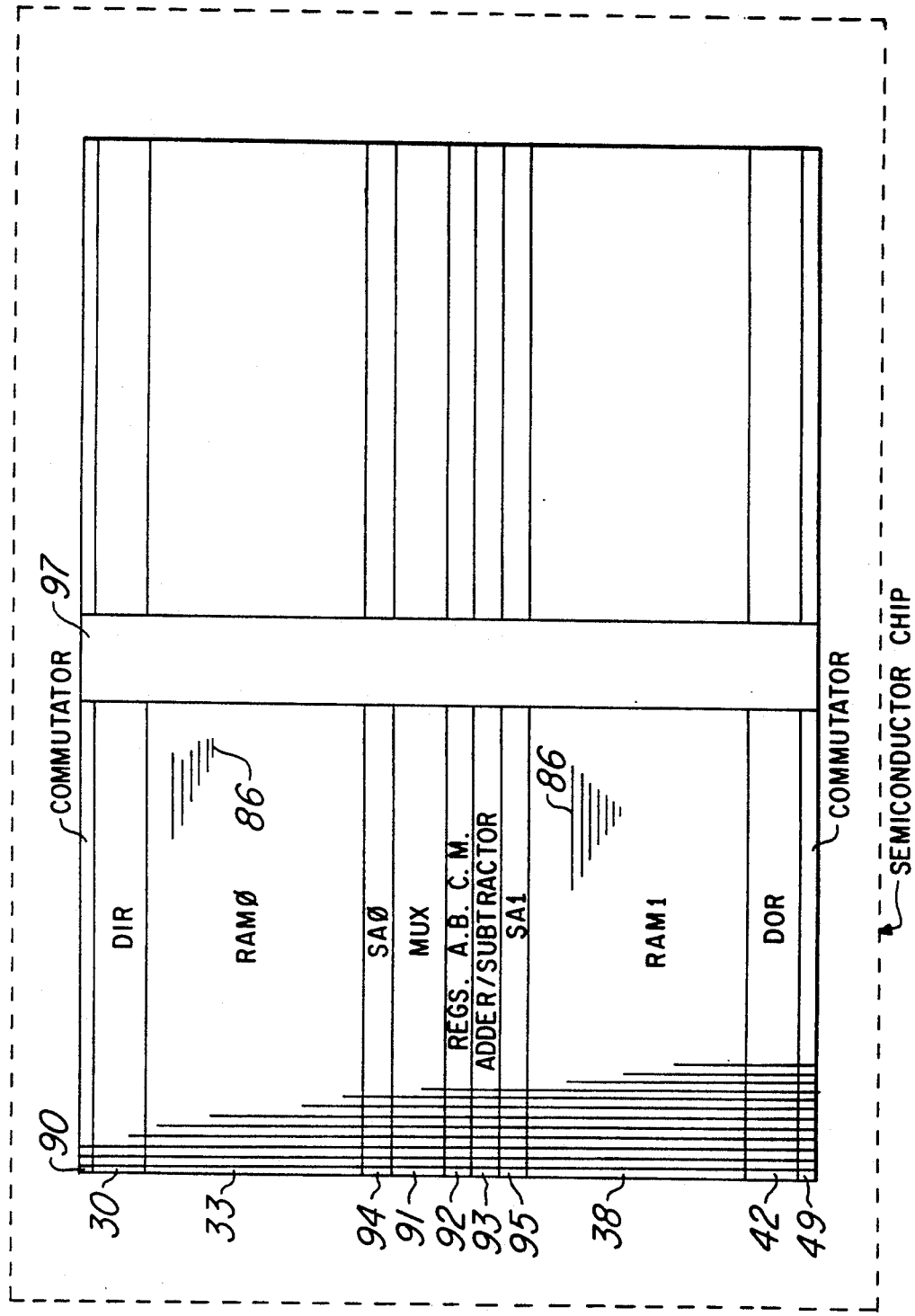
FIG. 6 is greatly-enlarged diagram of the layout of a semiconductor chip containing the processor of FIG. 3 or 4.

The serial video processor of FIGS. 3 and 4 is constructed in a single integrated circuit for which the bar layout is shown in FIG. 6. Each of the 1024 processor elements is a vertical strip 90 of the array, and each strip 90 is made up of the RAM0 memory 33, the RAM1 memory 38, the 16-bit data input register 30, the 16-bit data output register 42, the multiplexers 61,62,63,64,70,71,72,73 and 78 in the area 91, the registers 56,57,58 and 59 in area 92, the adder/subtractor 75 and gates 76,77 in area 93, along with sense amplifiers 86 and 89 in areas 94 and 95. The construction of the CMOS sense amplifiers and the folded-bit line DRAM cells is of the type shown in U.S. Pat. No. 4,630,240, issued to Poteet, et al, assigned to Texas Instruments, for example. The word lines 86 and 87 run horizontally across the bar from row decoders and word-line drivers located in area 97. The operation of the RAM0/DIR combination with the 1024 sense amplifiers 86 is like that of a standard dynamic RAM, but no column decode or column addressing is needed of course since all 1024 processor elements operate at one time, every clock cycle. The operation of the RAM1/DOR combination is the same, except the output registers 42 may use static cells. The shift pointers 32 and 49 are standard shift register bits connected as ring counters.

The configuration of this video processor as a linear array provides several advantages. By "linear array" is meant that the 1024 (or whatever number) processor elements operate simultaneously on a whole horizontal line at a time in parallel, each in a one-bit serial processor element. This allows the interconnections to the memory, processor elements, and nearest neighbors to be quite regular, allowing the device to be laid out like a memory chip. The linear array processing a line at a time does not require physical connections to data for pixels above and below since the necessary interim data from previous lines is maintained in the local processor memory RAM0 and RAM1, thus eliminating the excessive pin out or interconnect problem.

It is important that the processor of the invention does not require any massive shifting of data along the processor elements or memories for a given line; the data inputted via input register DIR for a given element stays in the memories RAM0 and RAM1 for this element until it has been processed via the ALU in the same processor element, and outputted via DOR. This technique allows the processor elements to spend virtually all of their time processing while the independently-clocked data-in and data-out registers DIR and DOR handle the I/O function. The processor element has only to transfer its own data to and from the output and input registers prior to shifting.

The regularity in the linear layout reduces line lengths and parasitics to help minimize processor cycle time. This linear architecture of the serial video processor allows the length of the array (number of processor elements) to be arbitrarily lengthened during the design phase by stepping more elements and adjusting signal driver size for the larger load. The pin-out (number of pins for the semiconductor package) is not affected by the array length so that versions of the processor with more elements can be pin-compatible with smaller versions.

The feature of including two separate banks of independently-addressable RAM, that is RAM0 and RAM1, allows a complete addition or substraction to be performed in a single clock cycle. Thus, it is not necessary to first load a register with the addend in one cycle and then perform the addition in a second cycle. In real-time TV enhancement, this is quite important in being able to achieve the throughput needed.

A very important feature is that the linear layout allows for implementation of redundancy of the memories, processor element and input/output registers. This is important due to the large amount of dynamic memory on the chip.

Figure 7:
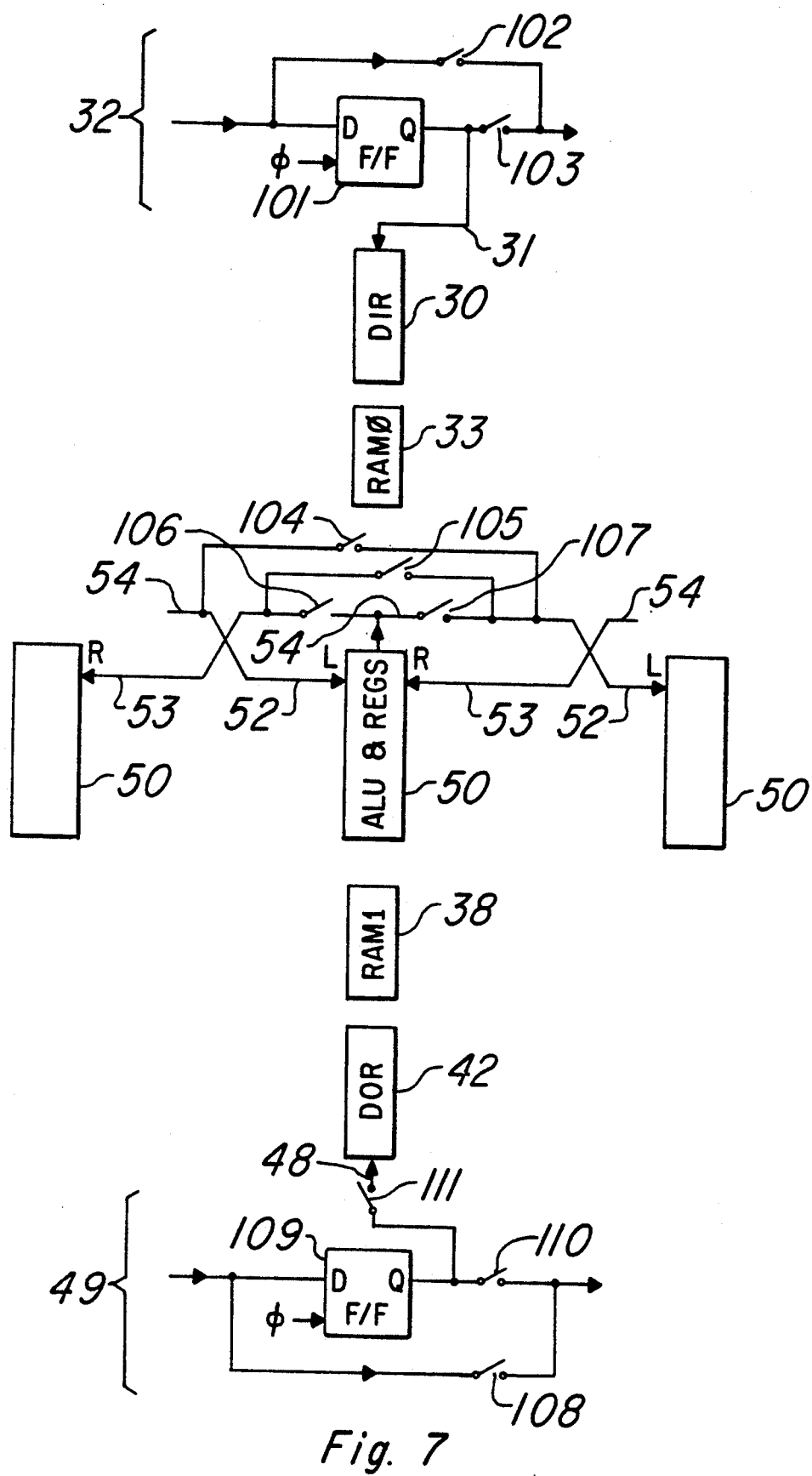
FIG. 7 is an electrical diagram in block form of connections for using redundant processor elements.

Referring to FIG. 7, redundancy is implemented by providing by-pass connections in the commutators 32 and 49, and in the processor elements 50, so that these parts may be omitted from operation of the unit. The DIR, RAM0, RAM1 and DOR need not have by-pass connections, because these parts are of no consequence when the pointers 31 and 48 do not address DIR and DOR for data loading and output. In FIG. 7, each cell or stage 101 of the commutator 32 has a normally-open by-pass switch 102, and a normally-closed series switch 103. These switches include conductors on the chip which may be shorted or blown by a laser, using methods of blowing laser fuses as commonly employed for memory devices having redundant rows and columns. Similarly, each processor element 50 contains normally-open switches 104 and 105 for the connection from L/R line 54 to the L input 52 of the next cell, and normally-closed switches 106 and 107 in series with the L/R output 54 that goes from this cell to the R input 53 of the left-hand element 50 and to the L input 52 of the right-hand element 50. The connections for the output register 42 include a normally-open bypass switch 108 for the stage 109 of the commutator 49, and normally-closed switches 110 and 111 in series with the line 40 and the connection from this stage 109 to the next one in the commutator. All of those switches are laser-blown fuses or the like. Thus, the chip is designed with a number of extra columns 90 or processor elements (of FIG. 3), all having the by-pass laser fuses of FIG. 7. For example, there may be eight extra so there would be 1032 when only 1024 are needed. The chip is tested, and faulty columns are by-passed by the laser fuse blowing operation while the slice containing the chips is still at the test station.

While this invention has been described with reference to an illustrative embodiment, this description is not intended to be construed in a limiting sense. Various modifications to the illustrative embodiment, as well as other embodiments of the invention, will be apparent to persons skilled in the art upon reference to this description. It is therefore contemplated that the appended claims will cover any such modifications or embodiments as fall within the true scope of the invention.

TABLE A

| MNEMONIC | OP-CODE | COMMENTS |
|---|---|---|
| REGISTER A | | |
| *The following are legal instructions for register A:* | | |
| register instructions | | |
| 0 > A | 1C000 | Logical 0 into A |
| A > A | 00000 | NO-OP |
| B > A | 14000 | Register B into register A |
| C > A | 18000 | Register C into register A |
| read instructions | | |
| R0(n) > A | 04000 | RAM0 address n into A, 0 < n < 127 |
| INP(m) > A | 04004 | DIR address m into A, 0 < m < 15 |
| R1(n) > A | 08000 | RAM1 address n into A |
| OUT(m) > A | 08020 | DOR address m into A |
| read from left cell into A / out to right cell's register A | | |
| LR0(n) > A | 10040 | Cell-Left RAM0 address n into A |
| LINP(m) > A | 10044 | Cell-Left DIR address m into A |
| LR1(n) > A | 10080 | Cell-Left RAM1 address n into A |
| LOUT(m) > A | 100A0 | Cell-Left DOR address m into A |
| LB > A | 100C0 | Cell-Left register B into A |
| read from right cell into A / out to left cell's register A | | |
| RR0(n) > A | 0C040 | Cell-Right RAM0 address n into A |
| RINP(m) > A | 0C044 | Cell-Right DIR address m into A |
| RR1(n) > A | 0C080 | Cell-Right RAM1 address n into A |
| ROUT(m) > A | 0C0A0 | Cell-Right DOR address m into A |
| RB > A | 0C0C0 | Cell-Right register B into A |
| REGISTER B | | |
| *The following are legal instructions for register B:* | | |
| internal to cell | | |
| 0 > B | 03800 | Logical 0 into B |
| B > B | 00000 | NO-OP |
| A > B | 02800 | Register A into register B |
| C > B | 03000 | Register C into register B |
| R0(n) > B | 00800 | RAM0 address n into B, 0 <= n <= 127 |
| INP(m) > B | 00804 | DIR address m into B, 0 <= m <= 15 |
| R1(n) > B | 01000 | RAM1 address n into B |
| OUT(m) > B | 01020 | DOR address m into B |
| from left cell into B / out to right cell's register B | | |
| LR0(n) > B | 02040 | Cell-Left RAM0 address n into B |
| LINP(m) > B | 02044 | Cell-Left DIR address m into B |
| LR1(n) > B | 02080 | Cell-Left RAM1 address n into B |
| LOUT(m) > B | 020A0 | Cell-Left DOR address m into B |
| LB > B | 020C0 | Cell-Left register B into B |

TABLE A-continued

| MNEMONIC | OP-CODE | COMMENTS |
|---|---|---|
| from right cell into B / out to left cell's register B | | |
| RR0(n) > B | 01840 | Cell-Right RAM0 address n into B |
| RINP(m) > B | 01844 | Cell-Right DIR address m into B |
| RR1(n) > B | 01880 | Cell-Right RAM1 address n into B |
| ROUT(m) > B | 018A0 | Cell-Right DOR address m into B |
| RB > B | 018C0 | Cell-Right register B into B |
| REGISTER C | | |
| *The following are legal instructions for register C:* | | |
| register instructions | | |
| 0 > C | 00600 | Logical 0 into C |
| 1 > C | 00700 | Logical 1 into C |
| C > C | 00000 | NO-OP |
| A > C | 00200 | Register A into register C |
| B > C | 00300 | Register B into register C |
| CY > C | 00400 | ALU Carry into register C |
| BW > C | 00500 | ALU Borrow into register C |
| read instructions | | |
| R1(n) > C | 00100 | RAM1 address n into C |
| OUT(m) > C | 00120 | DOR address m into C |
| write instructions | | |
| C > R0(n) | 00001 (1) | Register C into RAM0 address n |
| C > INP(m) | 00005 | Register C into DIR address m |
| C > R1(n) | 00080 | Register C into RAM1 address n |
| C > OUT(m) | 00280 | Register C into DOR address m |
| REGISTER M | | |
| *The following are legal instructions for register M:* | | |
| internal to cell | | |
| 0 > M | C0000 | Logical 0 into M |
| 1 > M | E0000 | Logical 1 into M |
| C > M | A0000 | Register C into register M |
| M > M | 00000 | NO-OP |
| R0(n) > M | 20000 | RAM0 address n into M, 0 <= n <= 127 |
| INP(m) > M | 20004 | DIR address m into M, 0 <= m <= 15 |
| R1(n) > M | 40000 | RAM1 address n into M |
| OUT(m) > M | 40020 | DOR address m into M |
| from left cell into M / out to right cell's register M | | |
| LR0(n) > M | 80040 | Cell-Left RAM0 address n into M |
| LINP(m) > M | 80044 | Cell-Left DIR address m into M |
| LR1(n) > M | 80080 | Cell-Left RAM1 address n into M |
| LOUT(m) > M | 800A0 | Cell-Left DOR address m into M |
| LB > M | 800C0 | Cell-Left register B into M |
| from right cell into M / out to left cell's register M | | |
| RR0(n) > M | 60040 | Cell-Right RAM0 address n into M |
| RINP(m) > M | 60044 | Cell-Right DIR address m into M |
| RR1(n) > M | 60080 | Cell-Right RAM1 address n into M |
| ROUT(m) > M | 600A0 | Cell-Right DOR address m into M |
| RB > M | 600C0 | Cell-Right register B into M |

TABLE B

A. — two's complement (change sign):
Two's complement of an 8 bit number in RAM0 addresses 7-0 with the result in the same locations.

| clock cycle | mnemonics | | | | | |
|---|---|---|---|---|---|---|
| ;SUBTRACT NUMBER FROM ZERO | | | | | | |
| 1) | 0 > D : 1 > M | : 0 > A | : R0(0) > B | : 0 > C | : SM > R0(0) |
| 2) | 0 > D : M > M | : A > A | : R0(1) > B | : BW > C | : SM > R0(1) |
| 3) | 0 > D : M > M | : A > A | : R0(2) > B | : BW > C | : SM > R0(2) |
| 4) | 0 > D : M > M | : A > A | : R0(3) > B | : BW > C | : SM > R0(3) |

TABLE B-continued

| | | | | | |
|---|---|---|---|---|---|
| 5) | 0 > D : M > M | : A > A | : R0(4) > B | : BW > C | : SM > R0(4) |
| 6) | 0 > D : M > M | : A > A | : R0(5) > B | : BW > C | : SM > R0(5) |
| 7) | 0 > D : M > M | : A > A | : R0(6) > B | : BW > C | : SM > R0(6) |
| 8) | 0 > D : M > M | : A > A | : R0(7) > B | : BW > C | : SM > R0(7) |

--- B. absolute value:

Absolute value of an 8 bit two's complement number in RAM0 addresses 7-0 with the magnitude in RAM1 addresses 6-0 and the sign in R0(7).

;COMPLEMENT SIGN (RESULT IN C)

| | | | | | |
|---|---|---|---|---|---|
| 1) | 0 > D : 1 > M | : R0(7) > A | : 0 > B | : 1 > C | |
| 2) | 0 > D : | | | : BW > C | |

;FIND MAGNITUDE; USE DIVIDE MODE'S CY/BW CONTROL, I.E.,
IF # < 0 THEN
;SUBTRACT IT FROM 0; IF # > 0 THEN ADD IT TO 0

| | | | | | |
|---|---|---|---|---|---|
| 3) | 1 > D : C > M | : 0 > A | : R0(0) > B | : 0 > C | : SM > R1(0) |
| 4) | 1 > D : M > M | : A > A | : R0(1) > B | : CY > C | : SM > R1(1) |
| 5) | 1 > D : M > M | : A > A | : R0(2) > B | : CY > C | : SM > R1(2) |
| 6) | 1 > D : M > M | : A > A | : R0(3) > B | : CY > C | : SM > R1(3) |
| 7) | 1 > D : M > M | : A > A | : R0(4) > B | : CY > C | : SM > R1(4) |
| 8) | 1 > D : M > M | : A > A | : R0(5) > B | : CY > C | : SM > R1(5) |
| 9) | 1 > D : M > M | : A > A | : R0(6) > B | : CY > C | : SM > R1(6) |

--- C. fixed point addition:

Integer or signed two's complement addition of two 8 bit numbers located in RAM0 addresses 7-0 and RAM1 addresses 17-10; the sum is accumulated back into RAM0 addresses 8-0. Bit 8 is the Carry flag.

clock
cycle  mnemonics

;ADD NUMBERS BITWISE

| | | | | | |
|---|---|---|---|---|---|
| 1) | 0 > D : 1 > M | : R0(0) > A | : R1(10) > B | : 0 > C | : SM > R0(0) |
| 2) | 0 > D : M > M | : R0(1) > A | : R1(11) > B | : CY > C | : SM > R0(1) |
| 3) | 0 > D : M > M | : R0(2) > A | : R1(12) > B | : CY > C | : SM > R0(2) |
| 4) | 0 > D : M > M | : R0(3) > A | : R1(13) > B | : CY > C | : SM > R0(3) |
| 5) | 0 > D : M > M | : R0(4) > A | : R1(14) > B | : CY > C | : SM > R0(4) |
| 6) | 0 > D : M > M | : R0(5) > A | : R1(15) > B | : CY > C | : SM > R0(5) |
| 7) | 0 > D : M > M | : R0(6) > A | : R1(16) > B | : CY > C | : SM > R0(6) |
| 8) | 0 > D : M > M | : R0(7) > A | : R1(17) > B | : CY > C | : SM > R0(7) |
| 9) | | | | : CY > R1(8) | |

Integer or signed two's complement addition of two 8 bit numbers located in RAM0 at address 7-0 and 15-8; the sum is accumulated back into addresses 16-8. Both source addresses in the same RAM bank is worst case for addition.

clock
cycle  mnemonics

;FETCH ADDEND 'A'

| | | | | | |
|---|---|---|---|---|---|
| 1) | | R0(0) > A | | | |

;FETCH ADDEND 'B', ADD, AND WRITE RESULT BACK

| | | | | | |
|---|---|---|---|---|---|
| 2) | 0 > D : 1 > M | : A > A | : R0(8) > B | : 0 > C | : SM > R0(8) |

;MAINTAIN PREVIOUS CARRY BIT

| | | | | | |
|---|---|---|---|---|---|
| 3) | 0 > D : M > M | : R0(1) > A | | : CY > C | |
| 4) | 0 > D : M > M | : A > A | : R0(9) > B | : C > C | : SM > R0(9) |
| 5) | 0 > D : M > M | : R0(2) > A | | : CY > C | |
| 6) | 0 > D : M > M | : A > A | : R0(10) > B | : C > C | : SM > R0(10) |
| 7) | 0 > D : M > M | : R0(3) > A | | : CY > C | |
| 8) | 0 > D : M > M | : A > A | : R0(11) > B | : C > C | : SM > R0(11) |
| 9) | 0 > D : M > M | : R0(4) > A | | : CY > C | |
| 10) | 0 > D : M > M | : A > A | : R0(12) > B | : C > C | : SM > R0(12) |
| 11) | 0 > D : M > M | : R0(5) > A | | : CY > C | |
| 12) | 0 > D : M > M | : A > A | : R0(13) > B | : C > C | : SM > R0(13) |
| 13) | 0 > D : M > M | : R0(6) > A | | : CY > C | |
| 14) | 0 > D : M > M | : A > A | : R0(14) > B | : C > C | : SM > R0(14) |
| 15) | 0 > D : M > M | : R0(7) > A | | : CY > C | |
| 16) | 0 > D : M > M | : A > A | : R0(15) > B | : C > C | : SM > R0(15) |
| 17) | | | | : CY > R0(16) | |

--- D. fixed point subtraction:

Integer or signed two's complement subtraction of two 8 bit numbers located in RAM0 addresses 7-0 and RAM1 addresses 17-10; the difference is accumulated back into RAM0 addresses 8-0. Bit 8 is the Borrow flag.

clock
cycle  mnemonics

;SAME AS ADDITION EXCEPT USES BORROW EACH TIME

| | | | | | |
|---|---|---|---|---|---|
| 1) | 0 > D : 1 > M | : R0(0) > A | : R1(10) > B | : 0 > C | : SM > R0(0) |
| 2) | 0 > D : M > M | : R0(1) > A | : R1(11) > B | : BW > C | : SM > R0(1) |
| 3) | 0 > D : M > M | : R0(2) > A | : R1(12) > B | : BW > C | : SM > R0(2) |
| 4) | 0 > D : M > M | : R0(3) > A | : R1(13) > B | : BW > C | : SM > R0(3) |
| 5) | 0 > D : M > M | : R0(4) > A | : R1(14) > B | : BW > C | : SM > R0(4) |
| 6) | 0 > D : M > M | : R0(5) > A | : R1(15) > B | : BW > C | : SM > R0(5) |
| 7) | 0 > D : M > M | : R0(6) > A | : R1(16) > B | : BW > C | : SM > R0(6) |
| 8) | 0 > D : M > M | : R0(7) > A | : R1(17) > B | : BW > C | : SM > R0(7) |
| 9) | | | | : BW > R1(8) | |

Signed two's complement subtraction of two 8 bit numbers located in RAM0 at address 7-0 and 15-8; the difference is accumulated back into addresses 16-8. Both source addresses in the same RAM bank is worst case for

TABLE B-continued subtraction. (15-8) minus (7-0) = (16-8)

| clock cycle | mnemonics | | | | |
|---|---|---|---|---|---|
| | ;SAME AS ADDITION EXCEPT USE BORROW | | | | |
| 1) | | R0(8) > A | | | |
| 2) | 0 > D : 1 > M | : A > A | : R0(0) > B | : 0 > C | : SM > R0(8) |
| 3) | 0 > D : M > M | : R0(9) > A | | : BW > C | |
| 4) | 0 > D : M > M | : A > A | : R0(1) > B | : C > C | : SM > R0(9) |
| 5-14) | . | (cycles 3 & 4 repeated 5 times for bits 2-6) | | | |
| 15) | 0 > D : M > M | : R0(15) > A | | : BW > C | |
| 16) | 0 > D : M > M | : A > A | : R0(7) > B | : C > C | : SM > R0(15) |
| 17) | | | | : BW > R0(16) | |

E. --- fixed point multiply:
Multiplication of two 8 bit positive integers located in RAM0, 7-0 and RAM0, 15-8; the 16 bit product is accumulated into RAM1, 15-0.

| clock cycle | mnemonics | | | | |
|---|---|---|---|---|---|
| | ;'AND' FIRST BIT OF MULTIPLIER WITH MULTIPLICAND, STORE SUM | | | | |
| 1) | 0 > D : R0(0) > M | | | | |
| 2) | 0 > D : M > M | : R0(8) > A | : 0 > B | : 0 > C | : SM > R1(0) |
| 3) | 0 > D : M > M | : R0(9) > A | : 0 > B | : 0 > C | : SM > R1(1) |
| 4) | 0 > D : M > M | : R0(10) > A | : 0 > B | : 0 > C | : SM > R1(2) |
| 5) | 0 > D : M > M | : R0(11) > A | : 0 > B | : 0 > C | : SM > R1(3) |
| 6) | 0 > D : M > M | : R0(12) > A | : 0 > B | : 0 > C | : SM > R1(4) |
| 7) | 0 > D : M > M | : R0(13) > A | : 0 > B | : 0 > C | : SM > R1(5) |
| 8) | 0 > D : M > M | : R0(14) > A | : 0 > B | : 0 > C | : SM > R1(6) |
| 9) | 0 > D : M > M | : R0(15) > A | : 0 > B | : 0 > C | : SM > R1(7) |
| | ;'AND' MULTIPLIER BIT 2 WITH MULTIPLICAND, SHIFT AND ADD TO PREVIOUS SUM | | | | |
| 10) | 0 > D : R0(1) > M | | | | |
| 11) | 0 > D : M > M | : R0(8) > A | : R1(1) > B | : 0 > C | : SM > R1(1) |
| 12) | 0 > D : M > M | : R0(9) > A | : R1(2) > B | : CY > C | : SM > R1(2) |
| 13) | 0 > D : M > M | : R0(10) > A | : R1(3) > B | : CY > C | : SM > R1(3) |
| 14) | 0 > D : M > M | : R0(11) > A | : R1(4) > B | : CY > C | : SM > R1(4) |
| 15) | 0 > D : M > M | : R0(12) > A | : R1(5) > B | : CY > C | : SM > R1(5) |
| 16) | 0 > D : M > M | : R0(13) > A | : R1(6) > B | : CY > C | : SM > R1(6) |
| 17) | 0 > D : M > M | : R0(14) > A | : R1(7) > B | : CY > C | : SM > R1(7) |
| 18) | 0 > D : M > M | : R0(15) > A | : 0 > B | : CY > C | : SM > R1(8) |
| 19) | 0 > D : M R0(2) > M | | | : CY > R1(9) | |
| | ;ETC. FOR EACH MULTIPLIER BIT | | | | |
| 20) | 0 > D : M > M | : R0(8) > A | : R1(2) > B | : 0 > C | : SM > R1(2) |
| 21) | 0 > D : M > M | : R0(9) > A | : R1(3) > B | : CY > C | : SM > R1(3) |
| 22) | 0 > D : M > M | : R0(10) > A | : R1(4) > B | : CY > C | : SM > R1(4) |
| 23) | 0 > D : M > M | : R0(11) > A | : R1(5) > B | : CY > C | : SM > R1(5) |
| 24) | 0 > D : M > M | : R0(12) > A | : R1(6) > B | : CY > C | : SM > R1(6) |
| 25) | 0 > D : M > M | : R0(13) > A | : R1(7) > B | : CY > C | : SM > R1(7) |
| 26) | 0 > D : M > M | : R0(14) > A | : R1(8) > B | : CY > C | : SM > R1(8) |
| 27) | 0 > D : M > M | : R0(15) > A | : R1(9) > B | : CY > C | : SM > R1(9) |
| 28) | 0 > D : R0(3) > M | | | : CY > R1(10) | |
| 29-36) | . | (similar to 20-27 except using R1(3) through R1(10)) | | | |
| 37) | 0 > D : R0(4) > M | | | : CY > R1(11) | |
| 38-45) | . | (similar to 20-27 except using R1(4) through R1(12)) | | | |
| 46) | 0 > D : R0(5) > M | | | : CY > R1(12) | |
| 47-54) | . | (similar to 20-27 except using R1(5) through R1(13)) | | | |
| 55) | 0 > D : R0(6) > M | | | : CY > R1(13) | |
| 56-63) | . | (similar to 20-27 except using R1(6) through R1(13)) | | | |
| 64) | 0 > D : R0(7) > M | | | : CY > R1(14) | |
| 65) | 0 > D : M > M | : R0(8) > A | : R1(7) > B | : 0 > C | : SM > R1(7) |
| 66) | 0 > D : M > M | : R0(9) > A | : R1(8) > B | : CY > C | : SM > R1(8) |
| 67) | 0 > D : M > M | : R0(10) > A | : R1(9) > B | : CY > C | : SM > R1(9) |
| 68) | 0 > D : M > M | : R0(11) > A | : R1(10) > B | : CY > C | : SM > R1(10) |
| 69) | 0 > D : M > M | : R0(12) > A | : R1(11) > B | : CY > C | : SM > R1(11) |
| 70) | 0 > D : M > M | : R0(13) > A | : R1(12) > B | : CY > C | : SM > R1(12) |
| 71) | 0 > D : M > M | : R0(14) > A | : R1(13) > B | : CY > C | : SM > R1(13) |
| 72) | 0 > D : M > M | : R0(15) > A | : R1(14) > B | : CY > C | : SM > R1(14) |
| 73) | | | | : CY > R1(15) | |

F. --- fixed point divide:
Division of two 8 bit positive integers; the dividend in RAM1, 7-0, and the divisor in RAM0, 7-0; the integer portion of the quotient is accumulated into RAM0, 15-8. In this example the remainder is discarded.

TABLE B-continued

Division by zero is flagged by RAM0, bit 16 = 0. RAM1, 15-8 are scratch areas.

| clock cycle | mnemonics | | | | | |
|---|---|---|---|---|---|---|
| | ;SEE IF DIVISOR IS ZERO, R0(16) = 0 IF 'Division by Zero'. | | | | | |
| 1) | 0 > D : 1 > M | : 0 > A | : R0(0) > B | : 0 > C | | : SM > R1(8) |
| 2) | 0 > D : M > M | : A > A | : R0(1) > B | : BW > C | | : SM > R1(9) |
| 3) | 0 > D : M > M | : A > A | : R0(2) > B | : BW > C | | : SM > R1(10) |
| 4) | 0 > D : M > M | : A > A | : R0(3) > B | : BW > C | | : SM > R1(11) |
| 5) | 0 > D : M > M | : A > A | : R0(4) > B | : BW > C | | : SM > R1(12) |
| 6) | 0 > D : M > M | : A > A | : R0(5) > B | : BW > C | | : SM > R1(13) |
| 7) | 0 > D : M > M | : A > A | : R0(6) > B | : BW > C | | : SM > R1(14) |
| 8) | 0 > D : M > M | : A > A | : R0(7) > B | : BW > C | | : SM > R1(15) |
| 9) | | | | : C > R0(16) | | |
| | ;ENABLE DIVIDE MODE (D = 1), SUBTRACT DIVISOR/2 FROM DIVIDEND | | | | | |
| 10) | 1 > D : 0 > M | : R1(7) > A | : R0(0) > B | : 0 > C | | : SM > R1(7) |
| 11) | 1 > D : M > M | : R1(8) > A | : R0(1) > B | : CY > C | | : SM > R1(8) |
| 12) | 1 > D : M > M | : R1(9) > A | : R0(2) > B | : CY > C | | : SM > R1(9) |
| 13) | 1 > D : M > M | : R1(10) > A | : R0(3) > B | : CY > C | | : SM > R1(10) |
| 14) | 1 > D : M > M | : R1(11) > A | : R0(4) > B | : CY > C | | : SM > R1(11) |
| 15) | 1 > D : M > M | : R1(12) > A | : R0(5) > B | : CY > C | | : SM > R1(12) |
| 16) | 1 > D : M > M | : R1(13) > A | : R0(6) > B | : CY > C | | : SM > R1(13) |
| 17) | 1 > D : M > M | : R1(14) > A | : R0(7) > B | : CY > C | | : SM > R1(14) |
| | ;PRETEND THAT R0(8) IS A ZERO (B = 0) | | | | | |
| 18) | 1 > D : M > M | : R1(15) > A | : 0 > B | : CY > C | | : SM > R1(15) |
| | ;CARRY BIT IS COMPLEMENT OF QUOTIENT (COMPLEMENTED LATER) | | | | | |
| 19) | | | | : CY > R0(15) | | |
| | ;THIS BIT CONTROLS WHETHER CY OR BW IS FED BACK (ADD OR SUBTRACT) | | | | | |
| 20) | 1 > D : R0(15) > M | | | | | |
| | ;ONE MORE BIT IS PICKED UP EACH ADD/SUBTRACT PASS | | | | | |
| 21) | 1 > D : M > M | : R1(6) > A | : R0(0) > B | : 0 > C | | : SM > R1(6) |
| 22) | 1 > D : M > M | : R1(7) > A | : R0(1) > B | : CY > C | | : SM > R1(7) |
| 23) | 1 > D : M > M | : R1(8) > A | : R0(2) > B | : CY > C | | : SM > R1(8) |
| 24) | 1 > D : M > M | : R1(9) > A | : R0(3) > B | : CY > C | | : SM > R1(9) |
| 25) | 1 > D : M > M | : R1(10) > A | : R0(4) > B | : CY > C | | : SM > R1(10) |
| 26) | 1 > D : M > M | : R1(11) > A | : R0(5) > B | : CY > C | | : SM > R1(11) |
| 27) | 1 > D : M > M | : R1(12) > A | : R0(6) > B | : CY > C | | : SM > R1(12) |
| 28) | 1 > D : M > M | : R1(13) > A | : R0(7) > B | : CY > C | | : SM > R1(13) |
| 29) | 1 > D : M > M | : R1(14) > A | : 0 > B | : CY > C | | : SM > R1(14) |
| 30) | 1 > D : M > M | : R1(15) > A | : B > B | : CY > C | | : SM > R1(15) |
| 31) | | | | : CY > R0(14) | | |
| 32) | 1 > D : R0(14) > M | | | | | |
| 33) | 1 > D : M > M | : R1(5) > A | : R0(0) > B | : 0 > C | | : SM > R1(5) |
| 34) | 1 > D : M > M | : R1(6) > A | : R0(1) > B | : CY > C | | : SM > R1(6) |
| 35) | 1 > D : M > M | : R1(7) > A | : R0(2) > B | : CY > C | | : SM > R1(7) |
| 36) | 1 > D : M > M | : R1(8) > A | : R0(3) > B | : CY > C | | : SM > R1(8) |
| 37) | 1 > D : M > M | : R1(9) > A | : R0(4) > B | : CY > C | | : SM > R1(9) |
| 38) | 1 > D : M > M | : R1(10) > A | : R0(5) > B | : CY > C | | : SM > R1(10) |
| 39) | 1 > D : M > M | : R1(11) > A | : R0(6) > B | : CY > C | | : SM > R1(11) |
| 40) | 1 > D : M > M | : R1(12) > A | : R0(7) > B | : CY > C | | : SM > R1(12) |
| 41) | 1 > D : M > M | : R1(13) > A | : 0 > B | : CY > C | | : SM > R1(13) |
| 42) | 1 > D : M > M | : R1(14) > A | : B > B | : CY > C | | : SM > R1(14) |
| 43) | 1 > D : M > M | : R1(15) > A | : B > B | : CY > C | | : SM > R1(15) |
| 44) | | | | : CY > R0(13) | | |
| 45) | 1 > D : R0(13) > M | | | | | |
| 46) | 1 > D : M > M | : R1(4) > A | : R0(0) > B | : 0 > C | | : SM > R1(4) |
| 47) | 1 > D : M > M | : R1(5) > A | : R0(1) > B | : CY > C | | : SM > R1(5) |
| 48) | 1 > D : M > M | : R1(6) > A | : R0(2) > B | : CY > C | | : SM > R1(6) |
| 49) | 1 > D : M > M | : R1(7) > A | : R0(3) > B | : CY > C | | : SM > R1(7) |
| 50) | 1 > D : M > M | : R1(8) > A | : R0(4) > B | : CY > C | | : SM > R1(8) |
| 51) | 1 > D : M > M | : R1(9) > A | : R0(5) > B | : CY > C | | : SM > R1(9) |
| 52) | 1 > D : M > M | : R1(10) > A | : R0(6) > B | : CY > C | | : SM > R1(10) |
| 53) | 1 > D : M > M | : R1(11) > A | : R0(7) > B | : CY > C | | : SM > R1(11) |
| 54) | 1 > D : M > M | : R1(12) > A | : 0 > B | : CY > C | | : SM > R1(12) |
| 55) | 1 > D : M > M | : R1(13) > A | : B > B | : CY > C | | : SM > R1(13) |
| 56) | 1 > D : M > M | : R1(14) > A | : B > B | : CY > C | | : SM > R1(14) |
| 57) | 1 > D : M > M | : R1(15) > A | : B > B | : CY > C | | : SM > R1(15) |
| 58) | | | | : CY > R0(12) | | |
| 59) | 1 > D : R0(12) > M | | | | | |
| 60) | 1 > D : M > M | : R1(3) > A | : R0(0) > B | : 0 > C | | : SM > R1(3) |
| 61) | 1 > D : M > M | : R1(4) > A | : R0(1) > B | : CY > C | | : SM > R1(4) |
| 62) | 1 > D : M > M | : R1(5) > A | : R0(2) > B | : CY > C | | : SM > R1(5) |
| 63) | 1 > D : M > M | : R1(6) > A | : R0(3) > B | : CY > C | | : SM > R1(6) |
| 64) | 1 > D : M > M | : R1(7) > A | : R0(4) > B | : CY > C | | : SM > R1(7) |
| 65) | 1 > D : M > M | : R1(8) > A | : R0(5) > B | : CY > C | | : SM > R1(8) |
| 66) | 1 > D : M > M | : R1(9) > A | : R0(6) > B | : CY > C | | : SM > R1(9) |
| 67) | 1 > D : M > M | : R1(10) > A | : R0(7) > B | : CY > C | | : SM > R1(10) |
| 68) | 1 > D : M > M | : R1(11) > A | : 0 > B | : CY > C | | : SM > R1(11) |
| 69) | 1 > D : M > M | : R1(12) > A | : B > B | : CY > C | | : SM > R1(12) |
| 70) | 1 > D : M > M | : R1(13) > A | : B > B | : CY > C | | : SM > R1(13) |

TABLE B-continued

| | | | | | |
|---|---|---|---|---|---|
| 71) | 1 > D : M > M | : R1(14) > A | : B > B | : CY > C | : SM > R1(14) |
| 72) | 1 > D : M > M | : R1(15) > A | : B > B | : CY > C | : SM > R1(15) |
| 73) | | | | : CY > R0(11) | |
| 74) | 1 > D : R0(11) > M | | | | |
| 75) | 1 > D : M > M | : R1(2) > A | : R0(0) > B | : 0 > C | : SM > R1(2) |
| 76) | 1 > D : M > M | : R1(3) > A | : R0(1) > B | : CY > C | : SM > R1(3) |
| 77) | 1 > D : M > M | : R1(4) > A | : R0(2) > B | : CY > C | : SM > R1(4) |
| 78) | 1 > D : M > M | : R1(5) > A | : R0(3) > B | : CY > C | : SM > R1(5) |
| 79) | 1 > D : M > M | : R1(6) > A | : R0(4) > B | : CY > C | : SM > R1(6) |
| 80) | 1 > D : M > M | : R1(7) > A | : R0(5) > B | : CY > C | : SM > R1(7) |
| 81) | 1 > D : M > M | : R1(8) > A | : R0(6) > B | : CY > C | : SM > R1(8) |
| 82) | 1 > D : M > M | : R1(9) > A | : R0(7) > B | : CY > C | : SM > R1(9) |
| 83) | 1 > D : M > M | : R1(10) > A | : 0 > B | : CY > C | : SM > R1(10) |
| 84) | 1 > D : M > M | : R1(11) > A | : B > B | : CY > C | : SM > R1(11) |
| 85) | 1 > D : M > M | : R1(12) > A | : B > B | : CY > C | : SM > R1(12) |
| 86) | 1 > D : M > M | : R1(13) > A | : B > B | : CY > C | : SM > R1(13) |
| 87) | 1 > D : M > M | : R1(14) > A | : B > B | : CY > C | : SM > R1(14) |
| 88) | 1 > D : M > M | : R1(15) > A | : B > B | : CY > C | : SM > R1(15) |
| 89) | | | | : CY > R0(10) | |
| 90) | 1 > D : R0(10) > M | | | | |
| 91) | 1 > D : M > M | : R1(1) > A | : R0(0) > B | : 0 > C | : SM > R1(1) |
| 92) | 1 > D : M > M | : R1(2) > A | : R0(1) > B | : CY > C | : SM > R1(2) |
| 93) | 1 > D : M > M | : R1(3) > A | : R0(2) > B | : CY > C | : SM > R1(3) |
| 93) | 1 > D : M > M | : R1(4) > A | : R0(3) > B | : CY > C | : SM > R1(4) |
| 94) | 1 > D : M > M | : R1(5) > A | : R0(4) > B | : CY > C | : SM > R1(5) |
| 95) | 1 > D : M > M | : R1(6) > A | : R0(5) > B | : CY > C | : SM > R1(6) |
| 96) | 1 > D : M > M | : R1(7) > A | : R0(6) > B | : CY > C | : SM > R1(7) |
| 97) | 1 > D : M > M | : R1(8) > A | : R0(7) > B | : CY > C | : SM > R1(8) |
| 98) | 1 > D : M > M | : R1(9) > A | : 0 > B | : CY > C | : SM > R1(9) |
| 99) | 1 > D : M > M | : R1(10) > A | : B > B | : CY > C | : SM > R1(10) |
| 100) | 1 > D : M > M | : R1(11) > A | : B > B | : CY > C | : SM > R1(11) |
| 101) | 1 > D : M > M | : R1(12) > A | : B > B | : CY > C | : SM > R1(12) |
| 102) | 1 > D : M > M | : R1(13) > A | : B > B | : CY > C | : SM > R1(13) |
| 103) | 1 > D : M > M | : R1(14) > A | : B > B | : CY > C | : SM > R1(14) |
| 104) | 1 > D : M > M | : R1(15) > A | : B > B | : CY > C | : SM > R1(15) |
| 105) | | | | : CY > R0(9) | |
| 106) | 1 > D : R0(9) > M | | | | |
| 107) | 1 > D : M > M | : R1(0) > A | : R0(0) > B | : 0 > C | : SM > R1(0) |
| 108) | 1 > D : M > M | : R1(1) > A | : R0(1) > B | : CY > C | : SM > R1(1) |
| 109) | 1 > D : M > M | : R1(2) > A | : R0(2) > B | : CY > C | : SM > R1(2) |
| 110) | 1 > D : M > M | : R1(3) > A | : R0(3) > B | : CY > C | : SM > R1(3) |
| 111) | 1 > D : M > M | : R1(4) > A | : R0(4) > B | : CY > C | : SM > R1(4) |
| 112) | 1 > D : M > M | : R1(5) > A | : R0(5) > B | : CY > C | : SM > R1(5) |
| 113) | 1 > D : M > M | : R1(6) > A | : R0(6) > B | : CY > C | : SM > R1(6) |
| 114) | 1 > D : M > M | : R1(7) > A | : R0(7) > B | : CY > C | : SM > R1(7) |
| 115) | 1 > D : M > M | : R1(8) > A | : 0 > B | : CY > C | : SM > R1(8) |
| 116) | 1 > D : M > M | : R1(9) > A | : B > B | : CY > C | : SM > R1(9) |
| 117) | 1 > D : M > M | : R1(10) > A | : B > B | : CY > C | : SM > R1(10) |
| 118) | 1 > D : M > M | : R1(11) > A | : B > B | : CY > C | : SM > R1(11) |
| 119) | 1 > D : M > M | : R1(12) > A | : B > B | : CY > C | : SM > R1(12) |
| 120) | 1 > D : M > M | : R1(13) > A | : B > B | : CY > C | : SM > R1(13) |
| 121) | 1 > D : M > M | : R1(14) > A | : B > B | : CY > C | : SM > R1(14) |
| 122) | 1 > D : M > M | : R1(15) > A | : B > B | : CY > C | : SM > R1(15) |
| 123) | | | | : CY > C | |
| | ;COMPLEMENT R0(8-15) TO GET TRUE QUOTIENT | | | | |
| 124) | 0 > D : 1 > M | : C > A | : 0 > B | : 1 > C | : SM > R0(8) |
| 125) | 0 > D : M > M | : R0(9) > A | : B > B | : C > C | : SM > R0(9) |
| 126) | 0 > D : M > M | : R0(10) > A | : B > B | : C > C | : SM > R0(10) |
| 127) | 0 > D : M > M | : R0(11) > A | : B > B | : C > C | : SM > R0(11) |
| 128) | 0 > D : M > M | : R0(12) > A | : B > B | : C > C | : SM > R0(12) |
| 129) | 0 > D : M > M | : R0(13) > A | : B > B | : C > C | : SM > R0(13) |
| 130) | 0 > D : M > M | : R0(14) > A | : B > B | : C > C | : SM > R0(14) |
| 131) | 0 > D : M > M | : R0(15) > A | : B > B | : C > C | : SM > R0(15) |

What is claimed is:

1. A serial video processor system for real-time processing of raster-scanned video, comprising:
an input for receiving digitized, multi-bit video data;
a plurality of serial video processors, each video processor having: an input register connected to receive said multi-bit video data from said input; an output register connected to transfer multi-bit processed data from the video processor; first and second random-access memories each having data inputs and outputs connected to said input and output registers and each having an address input; a serial ALU having a plurality of one-bit registers and multiplexer means to connect inputs and outputs of each said registers to data inputs and outputs of said first and second random-access memories, the multiplexer means also connecting inputs and outputs of some of the registers to the serial ALU of adjacent video processors; control inputs in common with all of said video processors receiving control and address sets of bits to select operation of the multiplexer means and addressing of said first and second random-access memories to thereby perform one-bit serial arithmetic/logic operations in each of the video processors for each set of control and address bits;
address means addressing the input registers of said plurality of serial video processors in a repeating sequence correlated with a raster scan to load said multi-bit video data from said input into said input registers; said address means also addressing the output registers of said plurality of serial video processors in a repeating sequence correlated with a raster scan to transfer processed multi-bit video data to an output;

control means having a multi-bit parallel output connected in common to said control inputs of all of said serial video processors to apply sequences of sets of control and address bits to said control inputs to result in real-time processing of said multi-bit video data.

2. A system according to claim 1 wherein an analog system input is connected to said input through an analog-to-digital converter, and said output is connected to an analog system output through a digital-to-analog converter.

3. A system according to claim 2 wherein said analog system input is sampled at a rate which is related to a multiple of the horizontal scan rate of said raster scan, said multiple being at least equal to the number of serial video processors.

4. A system according to claim 3 wherein there are at least as many of said serial video processors as there are pixels in a horizontal scan of said raster scan.

5. A system according to claim 1 wherein said first and second memories comprise a dynamic random-access memory having one differential sense amplifier for each of the serial video processors.

6. A system according to claim 1 wherein said input register of each video processor includes a first set of bits connected to receive said multi-bit video data from said input and a second set of bits connected to outputs of a frame memory.

7. A system according to claim 6 wherein said output register of each video processor includes a first set of bits connected to transfer said multi-bit processed data from said video processor to said output and a second set of bits connected to transfer processed data to inputs of said frame memory.

8. A system according to claim 7 wherein there are at least as many of said serial video processors as the number of pixels in a horizontal scan of said raster scan, and there is a delay of at least one of said horizontal scans between input of video data to said input and output of processed data at said output.

9. A system according to claim 8 wherein said frame memory stores processed video data for one frame of said raster scan.

10. A system according to claim 1 wherein each of said first and second random-access memories has a number of bits many times the number of bits in said input and output registers.

11. A serial processor system for high-speed processing comprising:
an input for receiving digitized, multi-bit signal data;
a plurality of serial processors in a linear array, each serial processor having: an input register connected to receive said multi-bit signal data from said input; an output register connected to transfer multi-bit processed data from the serial processor; random-access memory means having data inputs and outputs connected to said input and output registers and having at least one address input; a serial ALU element having a plurality of one-bit registers and multiplexer means to connect inputs and outputs of each said registers to data inputs and outputs of said random-access memory means, the multiplexer means also capable of connecting inputs and outputs of some of the one-bit registers to the serial ALU element of adjacent serial processors; control inputs in common with all of said serial processors receiving sets of control and address bits to select operation of the multiplexer means and addressing of said random-access memory means to thereby perform one-bit serial arithmetic/logic operations in each of the serial processors for each set of control and address bits;

first address means addressing the input registers of said plurality of serial processors in a repeating sequence correlated with said signal data to load said multi-bit signal data from said input into said input registers; and second address means addressing the output registers of said plurality of serial processors in a repeating sequence to transfer processed multi-bit data to an output;

control means having a multi-bit parallel output connected in common to said control inputs and address inputs for all of said serial processors to apply sequences of sets of control and address bits to said control inputs to result in high-speed processing of said multi-bit signal data.

12. A system according to claim 11 wherein said random-access memory means includes first and second memories comprising dynamic random-access memory having one differential sense amplifier for each of the first and second memories for each of the serial processors.

13. A system according to claim 11 wherein said input register of each serial processor includes a first set of bits connected to receive said multi-bit signal data from said input and a second set of bits connected to outputs of an auxiliary memory.

14. A system according to claim 11 wherein said random-access memory means has a number of bits many times the number of bits in said input and output registers.

15. A method of real-time processing of a raster-scanned video signal, comprising the steps of:
converting the video signal to multi-bit digital data at a sampling rate, and storing said digital data in a set of input registers, there being a number of said input registers corresponding to the number of pixels in a horizontal scan of the raster scan,
transferring the digital data in said registers to memory cells of a set of data memories,
performing a plurality of serial arithmetic/logic operations on said digital data in said set of data memories and returning processed data to said data memories in a set of one-bit serial processor elements, there being a corresponding one processor element for each of said input registers,
transferring the processed digital data from said set of data memories to a set of output registers, there being a number of said output registers corresponding to said number of input registers,
and converting digital data in said output registers to an output video signal.

16. A method according to claim 15 including the steps of storing processed video data from said set of output registers in a frame memory containing a set of memory cells for each pixel of all of said horizontal scans in one vertical scan of the raster scan, and transferring the stored video data to said set of input registers in synchronization with the converting of the video signal, whereby the input registers contain data from the stored frame and also converted data for the current horizontal scan.

17. A method according to claim 15 wherein, said step of performing serial arithmetic/logic operations is performed simultaneously in all of said processor elements.

18. A method according to claim 15 wherein at least two of said horizontal scans occurs between said step of storing the digital data in the one of the set of input registers and said step of transferring digital data from the set of data memories to said output register for a given pixel of one of said horizontal scans.

19. A method according to claim 15 wherein said set of data memories consists of first and second dynamic one-bit wide random-access memories having sense amplifiers clocked in synchronization with clocking of said serial processor elements.

20. A method of high-speed signal processing, comprising the steps of:
   converting an input signal to multi-bit digital data at a sampling rate, and loading in parallel said digital data in a set of input registers,
   transferring the digital data from said register to memory cells of a set of one-bit wide data memories, the data memories having a number of bits greatly exceeding the number of bits in one of said input registers,
   performing a plurality of serial arithmetic/logic operations on said digital data in said set of data memories and returning processed data to said data memories in a set of one-bit serial processor elements, there being a corresponding one processor element for each of said input registers,
   transferring one bit at a time the processed digital data from said set of data memories to a set of output registers, there being a number of said output registers corresponding to said number of input registers.

21. A method according to claim 20 including the steps of storing processed data from said set of output registers in a buffer memory for a period of time during which said input signal makes a complete cycle of a repeating sequence, and transferring the stored processed data to said set of input registers in synchronization with the converting of the input signal, whereby the input registers contain data from the buffer memory and also converted data for the current input signal.

22. A method according to claim 20 wherein said step of performing serial arithmetic/logic operations is performed simultaneously in all of said processor elements.

23. A method according to claim 20 wherein said set of data memories includes first and second dynamic random-access memories having sense amplifiers clocked in synchronization with clocking of said serial processor elements.

24. A video system comprising:
   a video display;
   a video signal receiver for receiving signal data;
   a controller operative to supply control signals; and
   a plurality of processors coupled such that said data is sequentially received and stored in a linear array across said plurality of processors, each processor having:
   a first register operative to receive a part of said signal data from said video signal receiver in parallel;
   a second register coupled to said video display;
   a memory circuit having portions respectively connected to said first and said second registers for transferring data to and from the first and second registers serially; and
   an arithmetic logic unit, connected to said memory circuit and said controller, responsive to the control signals from said controller for performing an arithmetic operation of the data received from said memory circuit.

25. The video system of claim 24 wherein said memory circuit comprises a first memory unit connected to said first register and a second memory unit connected to said second register.

26. The video system of claim 24 further comprising a decoder, connected to said controller and to said processors, said decoder responsive to control signals for generating an address signal to access the data locations of said memory circuit.

27. The video system of claim 24 further comprising an input means for selectively directing data inputs from said video signal receiver to said first register of the respective processor.

28. The video system of claim 24 further comprising an output means for selectively directing data outputs from said second register of the respective processor to said video display.

29. An image processing system comprising:
   an image input receiver for receiving serial image data;
   an analog-to-digital (A/D) converter connected to said image input receiver;
   a controlling circuit;
   a plurality of processors coupled such that said data is received sequentially and stored in a linear array across said plurality of processors and connected to said controlling circuit each said processor having:
   an input register operative to receive digital image data in parallel;
   a storage circuit including first and second portions, and first portion connected to said input register so as to receive data serially;
   an output register connected to said second portion so as to receive data serially and operative to hold output data; and
   a computing circuit connected to said storage circuit operative to perform an arithmetic operation on data received from said storage circuit;
   a digital-to-analog (D/A) converter connected to said output register; and
   an image output device connected to said D/A converter operative to receive signals from said D/A converter.

30. The image processing system of claim 29 further comprising a first and a second computing register, connected to said computing circuit and said storage circuit, wherein said computing circuit is responsive to control signals from said controlling circuit to perform an arithmetic operation on data from said registers and store computed data in one of said registers.

31. The image processing system of claim 29 wherein said controlling circuit also controls data transfers between said processors.

32. The image processing system of claim 29 further comprising a first and a second computing register, connected to said computing circuit and said storage circuit, wherein said storage circuit comprises a first storage device connected between said input register and said first computing register and a second storage device connected between said output register and said second computing register.

33. The image processing system of claim 29 further comprising a commutator circuit, connected to said controlling circuit and said processors, for controlling data flow to and from said D/A and said A/D converter.

34. The image processing system of claim 29 further comprising a frame memory, connected to said controlling circuit and said processors, having a plurality of data storage locations.

35. The image processing system of claim 34 further comprising a commutator circuit, connected to said controlling circuit, said processors and said frame memory, operative to control data flow between said processors and said frame memory.

36. An image data processing device comprising:
a plurality of computing circuits coupled such that said data is sequentially receive and stored in a linear array across said plurality of computing circuits, each computing circuit having:
an input register connected to receive signal in parallel data;
an output register;
a memory circuit including portions connected to said input and said output register for transferring data to and from the input and output registers serially;
an arithmetic circuit connected to said memory circuit operative to perform an arithmetic operation on data received; and
a controller circuit connected to said computing circuits for controlling the operation of said computing circuits.

37. The image data processing device of claim 36 further comprising an input computing register and an output computing register, connected to said controller circuit and said memory circuit, wherein said arithmetic circuit is responsive to a control signal from said controller circuit to perform an arithmetic operation on data from said registers and to store resulting data in one of said registers.

38. The image data processing device of claim 36 wherein said memory circuit comprises an input memory circuit and an output memory circuit connected to said input computing register and said output computing register respectively.

39. The image data processing device of claim 38 further comprising an input decoder and an output decoder, connected to said input memory circuit and said output memory circuit respectively and to said controller circuit, and responsive to a coded signal from said controller to decode the coded signal for addressing the memory locations of said memory circuits.

40. The image data processing device of claim 39 wherein said input decoder and said output decoder are also connected to said input register and said output register respectively, and are responsive to a coded signal from said controller circuit to decode the coded signal for controlling data transfers of said input register and said output register.

41. The image data processing device of claim 36 further comprising a commutator circuit, connected to said controller circuit and said computing circuits, and responsive to a control signal from said controller.

42. The image data processing device of claim 36 further comprising a frame memory, connected to said controller circuit and said computing circuits.

* * * * *